(12) United States Patent
Lease

(10) Patent No.: US 6,748,805 B2
(45) Date of Patent: Jun. 15, 2004

(54) MULTIPLE INPUT LEVEL SENSOR

(75) Inventor: Benjamin N. Lease, Knoxville, TN (US)

(73) Assignee: Robert Shaw Controls Company, Richmond, VA (US)

(*) Notice: Subject to any disclaimer, the term of this patent is extended or adjusted under 35 U.S.C. 154(b) by 124 days.

(21) Appl. No.: 10/051,954

(22) Filed: Jan. 17, 2002

(65) Prior Publication Data

US 2003/0131662 A1 Jul. 17, 2003

(51) Int. Cl.⁷ .................. G01F 23/72; G08B 21/00
(52) U.S. Cl. .................. 73/313; 73/311; 340/623; 116/228
(58) Field of Search .................. 73/311, 313, 314, 73/317; 340/623; 116/228

(56) References Cited

U.S. PATENT DOCUMENTS

| | | | | |
|---|---|---|---|---|
| 2,516,452 A | * | 7/1950 | Giers et al. | 73/311 |
| 3,086,397 A | * | 4/1963 | Hudson | 73/311 |
| 3,545,272 A | * | 12/1970 | McGill | 73/311 |
| 4,554,494 A | | 11/1985 | Howeth | |
| 5,103,673 A | * | 4/1992 | Sawada et al. | 73/313 |
| 5,283,569 A | * | 2/1994 | Nelson | 340/623 |
| 5,357,815 A | | 10/1994 | Williamson | |

* cited by examiner

Primary Examiner—Hezron Williams
Assistant Examiner—Katina Wilson
(74) Attorney, Agent, or Firm—Richard L. Sampson, Esq.; Robert J. Hampsch, Esq.

(57) ABSTRACT

A liquid level measuring apparatus is provided, which includes an input circuit configured to receive electrical signals from level sensors configured to provide an electrical signal proportional to a liquid level in a tank portion. The input circuit provides a single output signal proportional to the combined liquid level in one or more liquid storage vessel portions. The apparatus may further include or be connected to a transmitter such as a wireless transmitting device.

28 Claims, 3 Drawing Sheets

MULTIPLE INPUT LEVEL SENSOR

BACKGROUND OF THE INVENTION

1. Field of the Invention

The present invention relates generally to level sensors for liquid storage tanks. This invention more particularly relates to level sensors and operational circuitry therefor.

2. Background Information

Level sensors (e.g., float sensors) are commonly used to indicate the liquid level in a liquid storage vessel. For example, liquid storage tanks for fuel, oil, propane, natural gas, and anhydrous ammonia typically include one or more level sensors for indicating the liquid level therein. A typical level sensor includes a float arm, which translates the vertical displacement caused by changes in the liquid level to rotation of a drive magnet. A dial indicator disposed externally of the tank includes a mating pointer/magnet assembly that is typically coupled by magnetic flux to the drive magnet. As the drive magnet turns, the pointer magnet similarly rotates, and a pointer typically gives a visual indication of tank level. In addition there are numerous commercial devices that not only offer visual indication of level, but may also provide an electric signal proportional to level. For example the Hall Effect Twin Site Sender™ manufactured by Rochester Gauges, Inc., Dallas, Tex. utilizes a Hall effect sensor and provides a voltage output proportional to level. A similar device is also disclosed in U.S. Pat. No. 4,554,494 to Howeth. Alternatively, the Advanced Matrix Film Twin Site Sender™ also manufactured by Rochester Gauges, Inc., Dallas Tex., includes a pointer with a wiper assembly coupled to a conductive substrate forming a potentiometer whose output is proportional to level. A similar device is also disclosed in U.S. Pat. No. 5,357,815 to Williamson.

For many applications, such as industrial storage of liquid propane, oil, liquefied natural gas, ammonia, and other liquids, in which large numbers of tanks are employed, remote indication may be desirable. Robertshaw Control Company, Inc., of Richmond, Va. (the assignee of the present application) currently markets the Centeron® level monitoring system for the purpose of remotely monitoring the liquid level in liquid storage vessels. In some applications a single tank may include two or more level sensors (e.g., owing to the aspect ratio of the tank as discussed in more detail hereinbelow). Additionally, in the same or other applications, two or more tanks may be coupled together (e.g., through a manifold). Remote determination of the liquid level in these applications is more challenging, and therefore, there exists a need for an improved level sensor, and in particular, improved operational circuitry therefore.

SUMMARY OF THE INVENTION

One aspect of the present invention includes a material level measuring apparatus including a plurality of level sensor input ports each configured to receive an electrical signal corresponding to a material level in a storage vessel portion. An input circuit is configured to combine the received electrical signals and to generate an output signal that corresponds to a combined material level in a plurality of the storage vessel portions.

In another aspect, a liquid level measuring apparatus includes a plurality of level sensors each configured to generate an electrical signal proportional to a liquid level in a liquid storage vessel portion. An input circuit is provided, which has a plurality of input ports couplable to the plurality of level sensors. The input circuit is configured to receive the electrical signal from each of the plurality of level sensors, and includes an averaging circuit configured to combine the electrical signals. The averaging circuit has a plurality of resistors connected in parallel and at least one switch connected in series with at least one of the plurality of resistors, the switch being configured to selectively open and close a portion of the averaging circuit. The input circuit also includes a plurality of voltage followers, a single one of the voltage followers being connected in series with each of the plurality of resistors. The input circuit is configured to generate a single output signal which is proportional to the combined liquid level in a plurality of liquid storage vessel portions.

Another aspect of the invention includes an input circuit for a liquid level monitoring device. The input circuit includes a plurality of level sensor input ports each configured to receive an electrical signal corresponding to a material level in a storage vessel portion. The input circuit also includes a plurality of resistors connected in parallel and at least one switch connected in series with at least one of the resistors. The switch is configured to selectively open and close a portion of the input circuit. A plurality of voltage followers are respectively coupled in series with each of the resistors. The input circuit is configured to generate an output signal corresponding to a combined material level in a plurality of the storage vessel portions.

A still further aspect of the present invention includes a method for fabricating a liquid level measuring apparatus, including configuring a plurality of level sensor input ports to receive an electrical signal corresponding to a material level in a storage vessel portion. The method further includes coupling the input ports to an input circuit, configuring the input circuit to combine the received electrical signals; and configuring the input circuit to generate an output signal corresponding to a combined material level in a plurality of the storage vessel portions.

DETAILED DESCRIPTION

Figure 1:
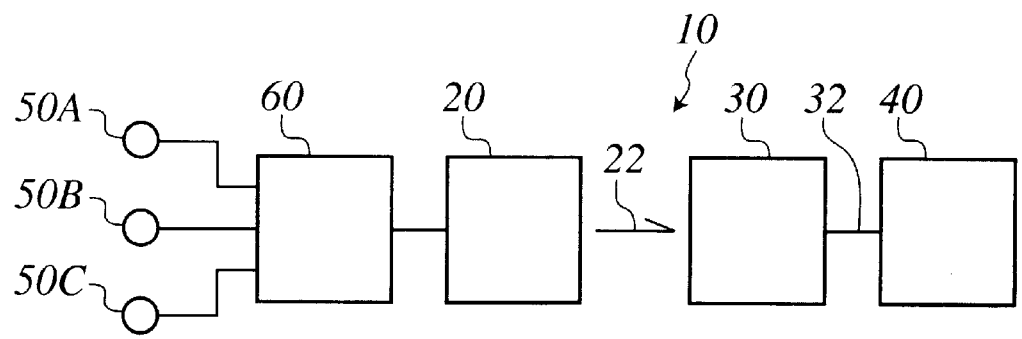
FIG. 1 is a block diagram of a wireless level monitoring system including the present invention.

Referring briefly to FIG. 1, a level monitoring system 10 including the present invention is illustrated. System 10 typically includes a plurality of level sensors 50A, 50B, 50C coupled to a sensor input circuit 60 which is further coupled to a monitoring device 20. Sensors 50A, 50B, 50C, input circuit 60, and monitoring device 20 are typically connected via conventional electrical connections. Monitoring device 20 (also referred to herein as a transmitter) may be coupled 22 (e.g., by a wireless radio frequency communications link)

to a local controller 30. Controller 30 may be further coupled 32 (e.g., by a telephone link including a modem and a hardwired telephone line or a cellular telephone link) to a central historian 40, which provides for various data processing, archival and retrieval functions, such as internet access to the liquid level in various liquid storage vessel(s).

Figure 2A:
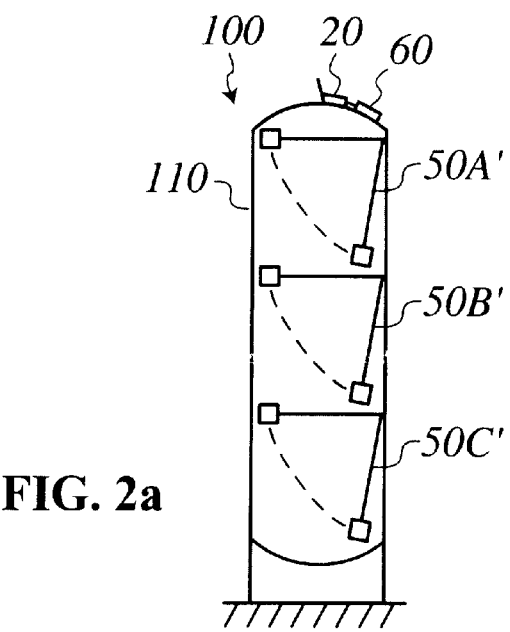
FIG. 2A is a schematic, cross sectional view of a storage tank including the present invention.

Referring now to FIG. 2A, a high aspect ratio liquid storage tank assembly 100 including the present invention is illustrated. Assembly 100 includes a plurality of float level sensors 50A', 50B', 50C' fitted to storage tank 110. Tank 110, as shown, is typical of many industrial liquid storage tanks (e.g., for storing liquid propane, liquefied natural gas, ammonia, and the like) in that its aspect ratio (i.e., height to width) tends to hinder the use of a single conventional float level sensor. Tank 110 may therefore be fitted with a plurality of level sensors 50A', 50B', 50C', each of which measures a portion of the level (i.e., liquid volume) therein. For example, as shown, level sensor 50C' measures the bottom third, sensor 50B' the middle third, and sensor 50A' the top third of tank 110. Assembly 100 further includes a sensor input circuit 60, which is configured to receive input signals from each of the level sensors 50A', 50B', 50C' and to provide an output signal proportional to the liquid level in tank 110. Sensor input circuit 60 may be coupled to a monitoring device 20 as described hereinabove with respect to FIG. 1.

Figure 2B:
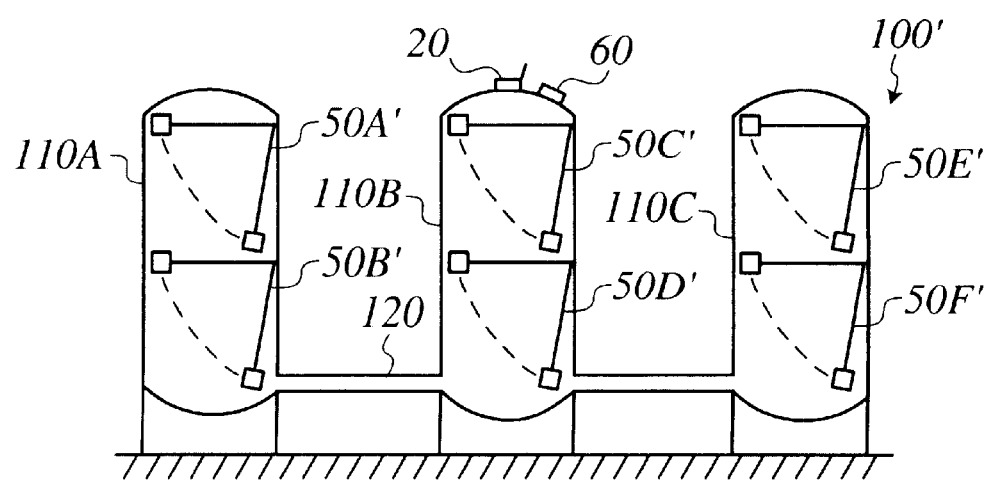
FIG. 2B is a schematic, cross sectional view of a plurality of coupled storage tanks including the present invention.

Referring to FIG. 2B another exemplary liquid storage tank assembly 100' including the present invention is illustrated. Assembly 100' includes a plurality of storage tanks 110A, 110B, 110C coupled together (e.g., through a manifold 120), each of the tanks 110A, 110B, 110C having at least one level sensor 50A', 50B', 50C', 50D', 50E', 50F' fitted thereto, each of which measures a portion of the total volume therein. For example, level sensors 50B', 50D', and 5F' measure the bottom half of tanks 110A, 110B, and 110C, respectively, while sensors 50A', 50C', and 50E' measure the top half thereof. Thus, each level sensor 50A', 50B', 50C', 50D', 50E', 50F' measures one-sixth of the total volume of tank assembly 100'. Assembly 100' also further includes a sensor input circuit 60 configured to receive input signals from each of the level sensors 50A', 50B', 50C', 50D', 50E', 50F' and to provide an output signal proportional to the liquid level in tank 110 to a monitoring device 20.

The present invention is advantageous in that it provides for a relatively simple and inexpensive multiple input level sensor for monitoring the liquid level in a liquid storage vessel (e.g., a liquid propane, liquefied natural gas, or ammonia storage tank). This invention is further advantageous in that it provides for a multiple input monitor device capable of monitoring the liquid level in storage vessels and/or storage vessel systems (e.g., storage tanks coupled via a manifold) including a plurality of level sensors. Other advantages of this invention are discussed in more detail hereinbelow in a further discussion of various embodiments thereof.

Figure 3:
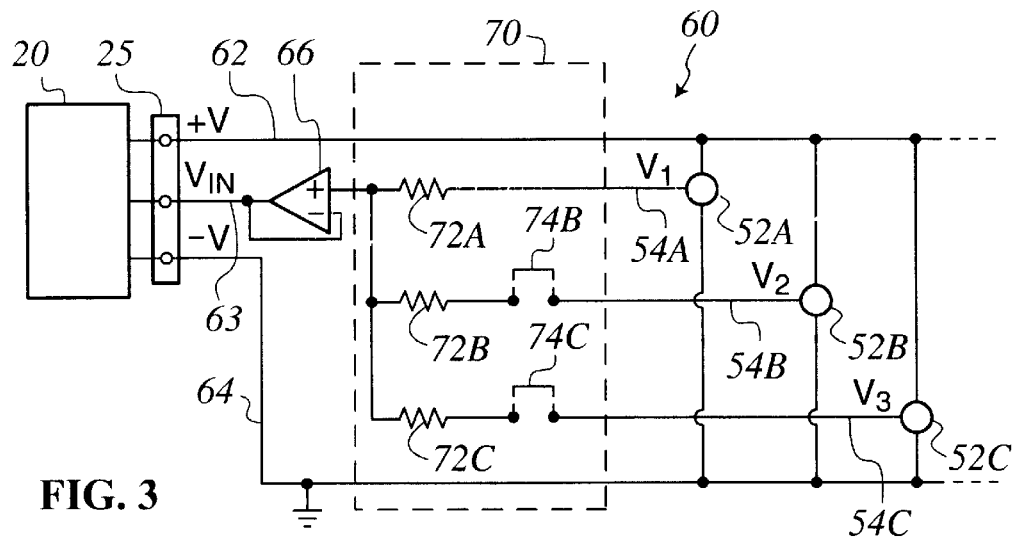
FIG. 3 is a schematic illustration including one embodiment of an input circuit of this invention.

Referring now to FIG. 3, one embodiment of sensor input circuit 60 of the present invention is illustrated. Circuit 60 typically includes a single output connector 25 (also referred to herein as an output port) and a plurality of input connectors 52A, 52B, 52C (also referred to herein as input ports) for receiving input signals from level sensors 50A, 50B, 50C (FIG. 1). The output connector 25 and input connectors 52A, 52B, 52C may include substantially any type of electrical connector known in the art, however, three pin connectors are typically desirable to couple power 62 and ground 64 lines (e.g., such that the circuit 60 and sensors 50A, 50B, 50C may be powered by monitoring device 20) as well as to couple signal output 63, or signal input line 54A, 54B, 54C, respectively.

The sensors generate sensor inputs, i.e., voltage inputs V1, V2, and V3, which are typically coupled to an averaging circuit 70 that includes a plurality of resistors 72A, 72B, 72C connected in parallel. Averaging circuit 70 may also include one or more switches 74B, 74C (such as in the form of jumpers) coupled in series with one or more of the resistors 72B, 72C. The artisan of ordinary skill will readily recognize that circuit 60 may include substantially any number of input connectors 52A, 52B, 52C, parallel resistors 72A, 72B, 72C, and jumpers 74A, 74B. Typically an equal number of input connectors 52A, 52B, 52C and parallel resistors 72A, 72B, 72C are used. Further, the number of jumpers 74A, 74B is typically one less than the number of input connectors 52A, 52B, 52C. Averaging circuit 70 is connected to a voltage follower 66, such as a field effect transistor (FET) or a conventional operational amplifier (op-amp). An op-amp configured as a unity gain buffer (as shown in FIG. 3) is typically desirable in that it may provide for a relatively high input impedance so that only negligible current input is required from sensors 50A, 50B, 50C (FIG. 1). An op-amp may also be desirable in that it may be configured to provide relatively low output impedance to minimize electronic noise. The output 63 from the voltage follower 66 is connected to output connector 25, which in turn may be couplable to a monitoring device 20.

Figure 4:
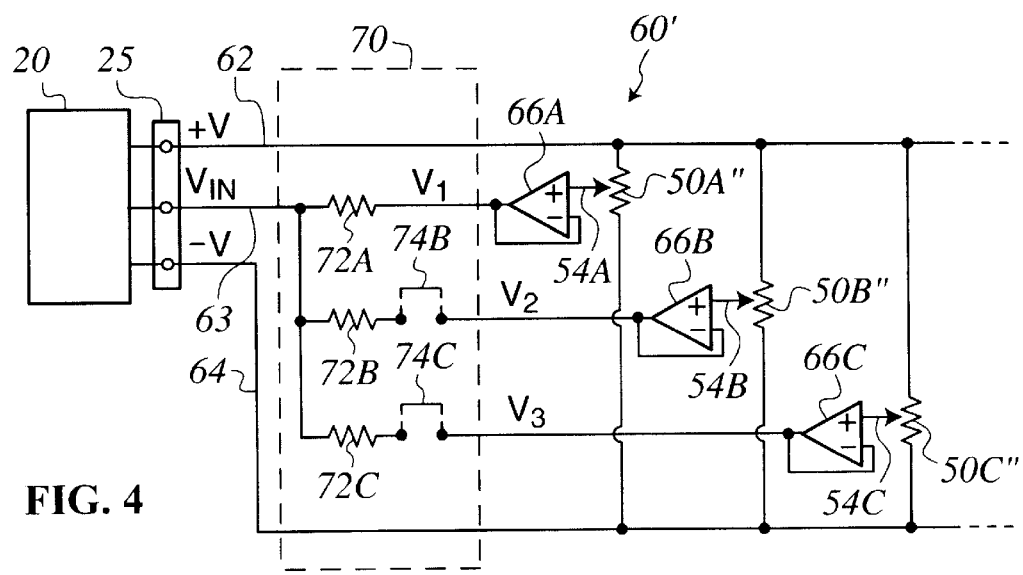
FIG. 4 is a schematic illustration including another embodiment of the input circuit of this invention.

Referring now to FIG. 4, an alternate embodiment of the sensor input circuit 60' of this invention is illustrated. Sensor input circuit 60 is substantially similar to input circuit 60 in that it includes an averaging circuit 70 having a plurality of resistors 72A, 72B, 72C connected in parallel. Sensor input circuit 60' differs from input circuit 60 in that each of the input lines 54A, 54B, 54C are connected to voltage followers 66A, 66B, 66C. Input circuit 60' is generally desirable for use with sensors 50A", 50B", SOC" having potentiometer outputs (e.g., the Advanced Matrix Film Twin Site Sender™ manufactured by Rochester Gauges, Inc., Dallas Tex.). For use with such sensors, each voltage follower 66A, 66B, 66C typically includes an op-amp configured as a unity gain buffer (i.e., with the output connected to the inverting input and the sensor input connected to the non-inverting input). Further, it is also generally desirable to utilize op-amps having relatively high input impedance (e.g., greater than about $10^4$ ohms) since loading potentiometers tends to skew their transfer function.

Figure 5:
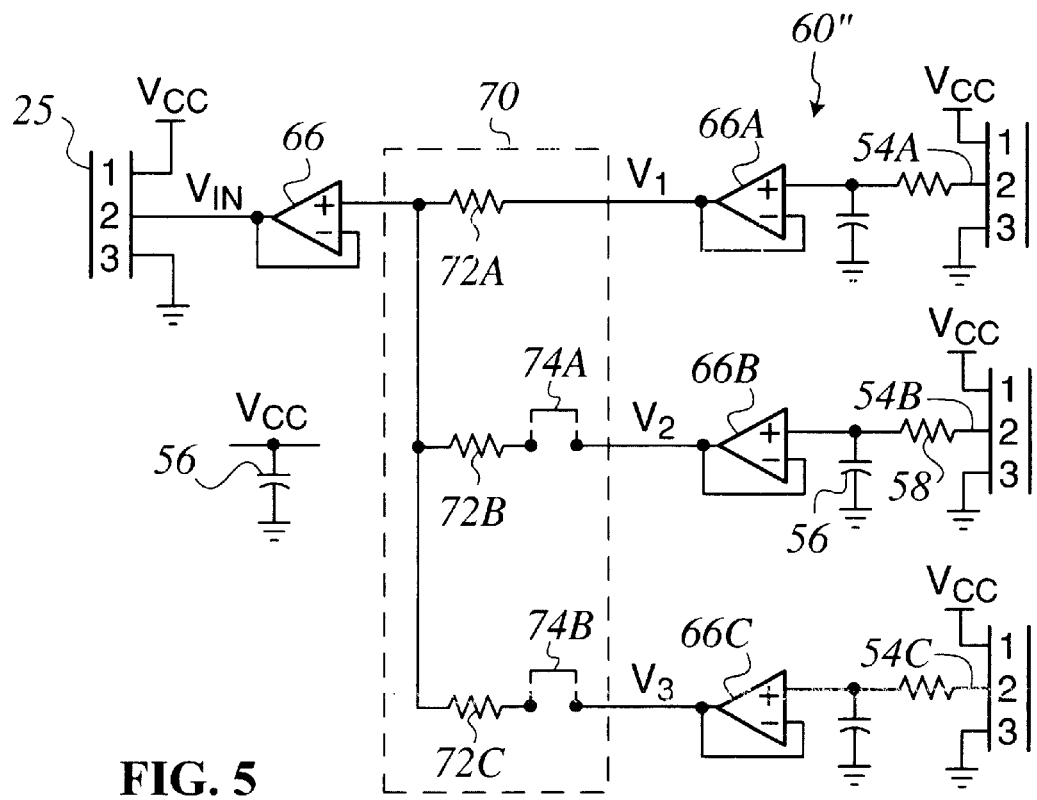
FIG. 5 is a schematic illustration including still another embodiment of the input circuit of this invention.

Referring now to FIG. 5, still another embodiment of the input circuit 60" of this invention is illustrated. Input circuit 60" is substantially similar to input circuits 60 and 60' in that it includes an averaging circuit 70 having a plurality of resistors 72A, 72B, 72C connected in parallel. Input circuit 60" differs from that of input circuits 60 and 60' in that each of input lines 54A, 54B, 54C are grounded through a capacitor 56 to substantially eliminate high frequency transients (the combination of the series resistor and shunt capacitance forms a single pole low pass filter to help eliminate electrical noise either induced by high frequency vibration, or EMI picked up by the sensor and lead wires. Input circuit 60" also includes voltage followers both upstream (i.e., followers 66A, 66B, 66C) and downstream (i.e., follower 66) of averaging circuit 70. Input circuit 60" may therefore be advantageous in that it may readily be used with sensors 50A, 50B, 50C (FIG. 1) having either a Hall effect output or a potentiometric output. Connectors 25, 52A', 52B', and 52C' may each be connected to common power (VCC or VDD) and ground lines, e.g., provided by monitoring device 20. By general convention, VCC is typically used to refer to transistor logic voltage values (typically in the range of from about 0 to about 7 volts) while VDD is typically used to refer to CMOS (complimentary MOS) logic voltage values (typically in the range from about 0 to about 9 volts).

As described hereinabove, the averaging circuit 70 of each input circuit 60, 60', 60" includes a plurality of resistors 72A, 72B, 72C connected in parallel to one another. In embodiments in which each of the sensors measure a substantially equal volume (e.g., sensors 50A', 50B', and 50C' in FIG. 2a), the resistance values of resistors 72A, 72B, 72C are substantially equal, so that averaging circuit 70 provides an unweighted average (Vin) of the input voltages V1, V2, and V3. In these embodiments, the average Vin is achieved by using each resister to drop the input voltages V (e.g., V1, V2 . . . Vn etc.) to (1/n)V, where n is the total number of sensors being used. (In the example shown in FIG. 2a, the resistors effectively drop the input voltages to $1/3^{rd}$ of their initial values.) These reduced voltage signals are coupled to one another to provide a summed signal which is essentially an average of the original V1, V2 . . . Vn, etc.

In an alternate embodiments, in which two or more of the sensors measure a mutually distinct volume (e.g., an application in which three tanks, each having a distinct volume, are coupled together) the resistance value of two or more of resistors 72A, 72B, 72C, etc., are mutually distinct. In this manner, averaging circuit 70 may provide a weighted average (Vin) of voltage inputs V1, V2, and V3. The artisan of ordinary skill will readily recognize that the required resistance values, relative to one another, will be inversely related to the volumes measured by each sensor, relative to one another, so that a higher volume will correspond to a lower resistance.

Jumpers 74A, 74B, etc., enable circuits 60, 60', 60" to be used in a system having substantially any number of sensors. For example, for a tank including two sensors, jumper 74B may be opened (effectively disconnecting input 54C from the averaging circuit 70). Averaging circuit 70 then provides an average (Vin) of the input voltages V1 and V2. Likewise, jumpers 74A and 74B may be opened for use with a tank including only one level sensor. The artisan of ordinary skill will readily recognize that while circuits 60, 60', 60" are shown to include three input lines 54A, 54B, 54C, they may be configured with substantially any number thereof. For example, for applications such as that shown in FIG. 2a, a circuit having relatively few input lines 54A, 54B, 54C may be sufficient. For applications such as that shown in FIG. 2b, in which multiple tanks are coupled together, a circuit having a significant number (e.g., several dozen) input lines may be required. For many applications a circuit including at least 3 input lines is desirable. Although switches 74A, 74B, etc., are shown and described herein as conventional jumpers, the skilled artisan will recognize that any of the various embodiments of the present invention disclosed herein may use nominally any type of switch. For example, electrically or electronically actuatable switches may be used, and may be actuated by a microcontroller such as discussed hereinbelow.

Figure 6:
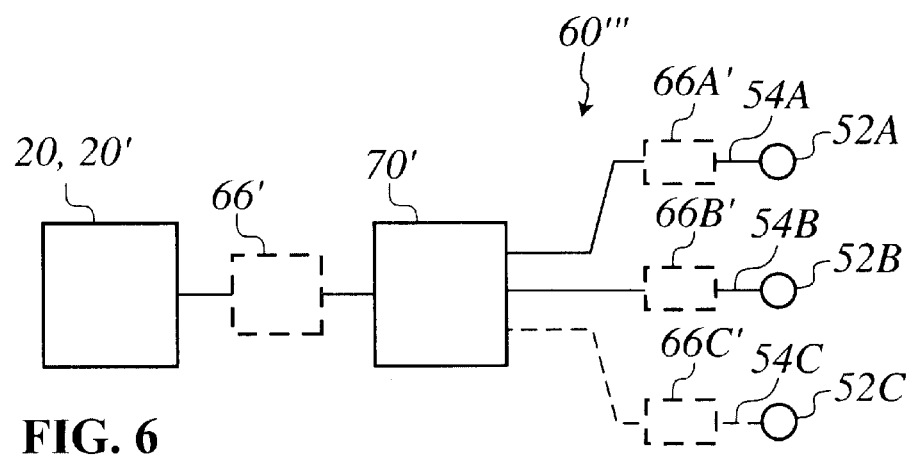
FIG. 6 is a schematic illustration including still another embodiment of the present invention.

Although the foregoing describes analog embodiments of the present invention, the skilled artisan will recognize that a digital equivalent 60''' of the circuits 60, 60', 60", may be provided without departing from the spirit and scope of the present invention. For example, as shown in FIG. 6, the (analog) voltage inputs V1, V2, and V3, supplied by each sensor to ports 52A, 52B, and 52C, etc., may be converted to digital signals using an analog to digital (A/D) converter 66A', 66B', 66C', etc. A microcontroller 70' may then be used to perform a numeric weighted average calculation based on the known volume of the tank portion(s) (such as shown in FIGS. 2a and 2b) being measured, to determine the total level (or volume) of material in the tank or tanks. The microcontroller may output this value directly to a suitable transmitter 20' capable of receiving digital inputs, or may convert the value to an analog signal (e.g., using a D/A converter 66') and output the analog value to the monitor 20. In a variation of this embodiment, sensors capable of generating digital outputs may be used to eliminate the need for the A/D converters 66A', 66B', 66C' and 66'.

Input circuits 60, 60', 60" may be used with substantially any type of monitoring device 20 (FIGS. 1, 2a, and 2b) configured for correlating a voltage input to a liquid level. Input circuits 60, 60', 60" are particularly useful for use with a battery-powered wireless monitoring device 20 including a wireless transmitter, such as the Centeron® monitor, (Robertshaw Control Company, Richmond, Va.). For example, monitoring device 20 may be configured to periodically wake, provide power to the sensors 50A', 50B', 50C', etc., and input circuit 60, 60', 60", take a reading of the tank(s) level, and transmit that level to a controller 30 (or some other data storing device) using any conventional wireless communication protocol. Alternatively, circuit 60, 60', 60" may be included within a monitoring device (such as the Centeron® monitor) to provide a unitary device capable of receiving input signals from a plurality of level sensors (e.g., sensors 50A, 50B, 50C of FIG. 1), determining a liquid level, and optionally transmitting (e.g., via wireless transmission as described hereinabove) the liquid level to a controller 30 (FIG. 1) or some other data managing device. In a further alternate embodiment, input circuit 60, 60', 60" may include a transmitting device capable of directly transmitting the output signal to a data-managing device.

Although embodiments of the present invention have been shown and described herein as measuring the level of liquid within a tank(s), the skilled artisan will recognize that non-liquid levels may be measured without departing from the spirit and scope of the present invention. For example, the level of solid particulate, such as grain, may be measured using the teachings of the present invention.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

EXAMPLE 1

An input circuit was fabricated according to the principles of the present invention in order to evaluate the performance thereof. The exemplary input circuit was fabricated to be substantially identical to that of input circuit 60" shown and described hereinabove. Values for the various components of the input circuit used in this example are given in Table 1. The exemplary circuit was tested in combination with a Centeron® wireless monitoring device and with level sensors fitted to a tank assembly similar to that shown in FIG. 2a. The circuit of this example was tested repeatedly without failure and was found to function well in combination with either Hall effect type level sensors or potentiometric type level sensors.

TABLE 1

| Figure Notation | Description | Value or Type |
| --- | --- | --- |
| 25 | Connector | 3-pin |
| 52A' | Connector | 3-pin |
| 52B' | Connector | 3-pin |
| 52C' | Connector | 3-pin |
| 56 | Capacitor | 1 nF |
| 58 | Resistor | 1 kΩ |
| 66 | Op-Amp | LMC6484 |
| 66A | Op-Amp | LMC6484 |
| 66B | Op-Amp | LMC6484 |
| 66C | Op-Amp | LMC6484 |
| 72A | Resistor | 10 kΩ |
| 72B | Resistor | 10 kΩ |
| 72C | Resistor | 10 kΩ |
| 74A | Jumper | |
| 74B | Jumper | |

The foregoing example and description is intended primarily for the purposes of illustration. Although the invention has been described according to an exemplary embodiment, it should be understood by those of ordinary skill in the art that modifications may be made without departing from the spirit of the invention. The scope of the invention is not to be considered limited by the description of the invention set forth in the specification or example, but rather as defined by the following claims.

What is claimed is:

1. A multiple input, liquid level monitoring device comprising:
   a plurality of level sensor input ports each configured to receive an electrical signal corresponding to a material level in a storage vessel portion;
   an input circuit configured to combine the received electrical signals;
   the input circuit being configured to generate an output signal;
   said output signal corresponding to a combined material level in a plurality of the storage vessel portions; and wherein said input circuit comprises an averaging circuit including a plurality of resistor connected in parallel
   a wireless transmitter configured to transmit the output signal to another device.

2. The material level measuring apparatus of claim 1, further comprising a plurality of level sensors respectively coupled to said plurality of level sensor input ports.

3. The apparatus of claim 2 wherein each of said plurality of level sensors provides a voltage output proportional to level.

4. The apparatus of claim 3 wherein the voltage output is generated by a Hall effect sensor.

5. The material level measuring apparatus of claim 1, comprising a liquid level measuring apparatus.

6. The apparatus of claim 1 wherein said input circuit includes at least one voltage follower.

7. The apparatus of claim 1 comprising a single output port couplable to a monitoring device, the monitoring device being configured to correlate the output signal to a liquid level.

8. The apparatus of claim 1 wherein said input circuit is incorporated into a monitoring device.

9. The apparatus of claim 1, wherein said input circuit is disposed within a microcontroller, said microcontroller being configured to receive digital electrical signals corresponding to the material level in storage vessel portions.

10. The monitoring device of claim 1 wherein said averaging circuit further comprises at least one switch connected in series with at least one of said plurality of resistors, said switch configured to selectively open and close a portion of said averaging circuit.

11. The apparatus of claim 1 wherein said input circuit includes at least one voltage follower.

12. The apparatus of claim 11 wherein said voltage follower comprises an operational amplifier.

13. A material level measuring apparatus comprising:
    a plurality of level sensor input ports each configured to receive an electrical signal corresponding to a material level in a storage vessel portion;
    an input circuit configured to combine the received electrical signals;
    the input circuit being configured to generate an output signal;
    said output signal corresponding to a combined material level in a plurality of the storage vessel portions;
    a plurality of level sensors respectively coupled to said plurality of level sensor input ports;
    the plurality of storage vessel portions including a high aspect ratio storage vessel;
    a first of said plurality of level sensors measuring a first portion of the high aspect ratio storage vessel; and
    a second of said plurality of level sensors measuring a second portion of the high aspect ratio storage vessel.

14. A material level measuring apparatus comprising:
    a plurality of level sensor input ports each configured to receive an electrical signal corresponding to a material level in a storage vessel portion;
    an input circuit configured to combine the received electrical signals;
    the input circuit being configured to generate an output signal;
    said output signal corresponding to a combined material level in a plurality of the storage vessel portions;
    a plurality of level sensors respectively coupled to said plurality of level sensor input ports;
    the one or more storage vessels including a first storage vessel and a second storage vessel;
    a first of said plurality of level sensors measuring at least a portion of the first storage vessel; and
    a second of said plurality of level sensors measuring at least a portion of the second storage vessel.

15. The apparatus of claim 14 Wherein the first storage vessel and the second storage vessel are coupled together.

16. A material level measuring apparatus comprising:
    a plurality of level sensor input ports each configured to receive an electrical signal corresponding to a material level in a storage vessel portion;
    an input circuit configured to combine the received electrical signals;
    the input circuit being configured to generate an output signal;
    said output signal corresponding to a combined material level in a plurality of the storage vessel portions;
    a plurality of level sensors respectively coupled to said plurality of level sensor input ports; and
    each of said plurality of level sensors being configured to provide a voltage output proportional to level;
    wherein the voltage output is generated by a potentiometer.

17. A material level measuring apparatus comprising:
a plurality of level sensor input ports each configured to receive an electrical signal corresponding to a material level in a storage vessel portion;
an input circuit configured to combine the received electrical signals;
the input circuit being configured to generate an output signal;
said output signal corresponding to a combined material level in a plurality of the storage vessel portions;
said plurality of level sensors being respectively coupled to said plurality of level sensor input ports; and
each of said plurality of level sensors providing a voltage output proportional to level;
wherein at least one of said plurality of level sensors comprises a Hall effect sensor and at least one other of said plurality of level sensors comprises a potentiometer.

18. A material level measuring apparatus comprising:
a plurality of level sensor input ports each configured to receive an electrical signal corresponding to a material level in a storage vessel portion;
an input circuit configured to combine the received electrical signals;
the input circuit being configured to generate an output signal; and
said output signal corresponding to a combined material level in a plurality of the storage vessel portions;
wherein said input circuit comprises an averaging circuit including a plurality of resistors connected in parallel.

19. The apparatus of claim 18 wherein each of said plurality of resistors includes a substantially equal resistance value.

20. The apparatus of claim 18 wherein at least two of said plurality of resistors include mutually distinct resistance values.

21. The apparatus of claim 18 wherein said averaging circuit further comprises at least one switch connected in series with at least one of said plurality of resistors, said switch configured to selectively open and close a portion of said averaging circuit.

22. A material level measuring apparatus comprising:
a plurality of level sensor input ports each configured to receive an electrical signal corresponding to a material level in a storage vessel portion;
an input circuit configured to combine the received electrical signals;
the input circuit being configured to generate an output signal;
said output signal corresponding to a combined material level in a plurality of the storage vessel portions;
said input circuit including at least one voltage follower; and
said voltage follower including an operational amplifier.

23. A material level measuring apparatus comprising:
a plurality of level sensor input ports each configured to receive an electrical signal corresponding to a material level in a storage vessel portion;
an input circuit configured to combine the received electrical signals;
the input circuit being configured to generate an output signal;
said output signal corresponding to a combined material level in a plurality of the storage vessel portions;
said input circuit including at least one voltage follower; and
an averaging circuit including a plurality of resistors connected in parallel and a plurality of voltage followers, a single of said plurality of voltage followers being connected in series with each of said plurality of resistors.

24. A material level measuring apparatus comprising:
a plurality of level sensor input ports each configured to receive an electrical signal corresponding to a material level in a storage vessel portion;
an input circuit configured to combine the received electrical signals;
the input circuit being configured to generate an output signal;
said output signal corresponding to a combined material level in a plurality of the storage vessel portions;
a single output port couplable to a monitoring device, the monitoring device being configured to correlate the output signal to a liquid level; and wherein said input circuit comprises an averaging circuit including a plurality of resistor connected in parallel said monitoring device including a wireless transmitter.

25. A liquid level measuring apparatus comprising:
a plurality of level sensors;
each of said level sensors configured to generate an electrical signal proportional to a liquid level in a liquid storage vessel portion;
an input circuit;
said input circuit having a plurality of input ports couplable to said plurality of level sensors;
said input circuit configured to receive the electrical signal from each of said plurality of level sensors;
said input circuit including an averaging circuit configured to combine the electrical signals;
said averaging circuit having a plurality of resistors connected in parallel and at least one switch connected in series with at least one of said plurality of resistors, said switch configured to selectively open and close a portion of said averaging circuit;
said input circuit further including a plurality of voltage followers, a single of said plurality of voltage followers being connected in series with each of said plurality of resistors;
said input circuit being configured to generate a single output signal;
wherein said output signal is proportional to the combined liquid level in a plurality of liquid storage vessel portions.

26. A multiple input, liquid level monitoring device comprising:
a plurality of level sensor input ports each configured to receive an electrical signal corresponding to a material level in a storage vessel portion;
an input circuit configured to combine the received electrical signals;
the input circuit including a plurality of resistors connected in parallel and a plurality of voltage followers, a single of said plurality of voltage followers being connected in series with each of said plurality of resistors;
the input circuit being configured to generate an output signal;

said output signal corresponding to a combined material level in a plurality of the storage vessel portions; and a transmitter configured to transmit the output signal to another device.

27. An input circuit for a liquid level monitoring device, said input circuit comprising:

a plurality of level sensor input ports each configured to receive an electrical signal corresponding to a material level in a storage vessel portion;

a plurality of resistors connected in parallel and at least one switch connected in series with at least one of said plurality of resistors;

said switch configured to selectively open and close a portion of said input circuit;

a plurality of voltage followers, respectively coupled in series with each of said plurality of resistors;

said input circuit being configured to generate an output signal corresponding to a combined material level in a plurality of the storage vessel portions.

28. A method for fabricating a liquid level measuring apparatus comprising:

configuring a plurality of level sensor input ports to receive an electrical signal corresponding to a material level in a storage vessel portion;

coupling the input ports to an input circuit;

configuring the input circuit to combine the received electrical signals;

configuring the input circuit to generate an output signal corresponding to a combined material level in a plurality of the storage vessel portions;

providing a wireless transmitter configured to transmit inputs to another device; and coupling the input circuit with the wireless transmitter.

* * * * *